(12) United States Patent
Scherdin (10) Patent No.: US 10,266,058 B2
(45) Date of Patent: Apr. 23, 2019

(54) VEHICLE CHARGING INTERFACE UNIT, A SYSTEM FOR CHARGING A VEHICLE, AND A VEHICLE

(71) Applicant: Volvo Car Corporation, Gothenburg (SE)

(72) Inventor: Bjorn Scherdin, Trollhattan (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/688,999

(22) Filed: Aug. 29, 2017

(65) Prior Publication Data

US 2018/0086217 A1   Mar. 29, 2018

(30) Foreign Application Priority Data

Sep. 26, 2016  (EP) .................................. 16190533

(51) Int. Cl.

| | |
|---|---|
| *B60K 1/04* | (2006.01) |
| *H02J 7/00* | (2006.01) |
| *B60L 11/18* | (2006.01) |
| *H01R 13/64* | (2006.01) |
| *H01R 24/76* | (2011.01) |
| *H01R 27/00* | (2006.01) |
| *H01R 13/447* | (2006.01) |

(52) U.S. Cl.
CPC ............ *B60L 11/1818* (2013.01); *B60K 1/04* (2013.01); *B60L 11/185* (2013.01); *B60L 11/1816* (2013.01); *B60L 11/1825* (2013.01); *B60L 11/1846* (2013.01); *H01R 13/447* (2013.01); *H01R 13/64* (2013.01); *H01R 27/00* (2013.01); *H02J 7/0027* (2013.01); *H02J 7/0045* (2013.01); *H01R 24/76* (2013.01); *H01R 2201/26* (2013.01)

(58) Field of Classification Search
CPC .............. H01R 13/447; H01R 13/4532; H01R 13/4534; H01R 24/76; H01R 27/004; H01R 13/2018

See application file for complete search history.

(56) References Cited

U.S. PATENT DOCUMENTS 3,956,573 A * 5/1976 Myers .................... H02G 3/185
174/488
4,473,265 A * 9/1984 Dellinger ................. H02G 3/10
439/147

(Continued)

FOREIGN PATENT DOCUMENTS

| CN | 103587481 A | 2/2014 |
|---|---|---|
| DE | 102011006633 A1 | 3/2012 |

(Continued)

*Primary Examiner* — Edwin A. Leon
*Assistant Examiner* — Oscar C Jimenez
(74) *Attorney, Agent, or Firm* — Snyder, Clark, Lesch & Chung, LLP (57) ABSTRACT

A vehicle charging interface unit for connecting a battery unit of a vehicle to a charging cable, the charging interface unit comprising a connection device establishing electric connection between the charging interface unit and the battery unit and two or more connectors for connecting the charging cable to the charging interface unit, wherein the charging interface unit further comprises a mechanical blocking device, configured to allow access to only one of the two or more connectors.

15 Claims, 5 Drawing Sheets

(56) References Cited

U.S. PATENT DOCUMENTS

| | | | | | |
|---|---|---|---|---|---|
| 4,968,856 | A | * | 11/1990 | Bowley | H01R 13/447 174/67 |
| 4,997,103 | A | * | 3/1991 | Daly | G06F 1/1626 206/1.5 |
| 5,545,046 | A | | 8/1996 | Masuda et al. | |
| 5,701,232 | A | * | 12/1997 | Tang | G06F 1/1613 174/67 |
| 5,727,958 | A | * | 3/1998 | Chen | H01R 13/447 174/67 |
| 5,793,352 | A | * | 8/1998 | Greenberg | G09G 5/006 345/699 |
| 6,342,676 | B1 | * | 1/2002 | Ha | H02G 3/14 174/67 |
| 6,552,909 | B1 | * | 4/2003 | Liebenow | G06F 1/1616 361/679.02 |
| 7,438,589 | B1 | * | 10/2008 | Fleury | H01R 25/006 439/34 |
| 8,100,485 | B2 | * | 1/2012 | Ogasawara | G06F 1/181 312/294 |
| 8,367,926 | B2 | * | 2/2013 | Peng | H01R 13/5213 174/17 R |
| 2004/0106313 | A1 | * | 6/2004 | Drane | H01R 13/447 439/142 |
| 2005/0239308 | A1 | | 10/2005 | Cummings et al. | |
| 2011/0151693 | A1 | | 6/2011 | Loo et al. | |
| 2011/0244699 | A1 | * | 10/2011 | Bernstein | A61B 5/14532 439/135 |
| 2013/0342165 | A1 | * | 12/2013 | Brimacombe | B60L 11/1824 320/109 |
| 2014/0312695 | A1 | * | 10/2014 | Czarnecki | H01R 13/447 307/41 |
| 2015/0104961 | A1 | * | 4/2015 | Bito | B60L 11/1818 439/142 |
| 2015/0191093 | A1 | * | 7/2015 | Yamamaru | B60L 11/123 320/109 |
| 2017/0098912 | A1 | * | 4/2017 | Chang | H01R 13/504 |
| 2017/0166070 | A1 | * | 6/2017 | Dunger | B60L 11/1818 |
| 2017/0197517 | A1 | * | 7/2017 | Jamieson | B60L 11/1816 |
| 2018/0037128 | A1 | * | 2/2018 | Gerber | B60L 11/1838 |

FOREIGN PATENT DOCUMENTS

| | | |
|---|---|---|
| FR | 3019499 A1 | 10/2015 |
| FR | 3024964 A1 | 2/2016 |
| JP | H11252810 A | 9/1999 |

* cited by examiner

VEHICLE CHARGING INTERFACE UNIT, A SYSTEM FOR CHARGING A VEHICLE, AND A VEHICLE

TECHNICAL FIELD

The present disclosure relates to a vehicle charging interface unit connecting a battery unit of a vehicle to a charging cable, the vehicle charging interface unit comprises two or more connectors for connecting the charging cable to the vehicle. The disclosure further relates to a system for charging a vehicle and a vehicle comprising a charging interface unit.

BACKGROUND

Electric vehicles generally relate to vehicles that have batteries or battery units that store energy, where the batteries are designed to provide electrical power for propelling and accelerating the vehicle and also for providing power to electrical systems used in the vehicle. The stored energy is consumed when the electric vehicle is used and the battery needs to be re-charged in order to replenish the level of stored energy through a connection to an external electric power supply.

Hybrid electric vehicles are using a combination of an internal combustion engine system and an electric propulsion system. The internal combustion engine can be operated intermittently to provide power to the hybrid electric vehicle's driveline when needed depending on the driving conditions. In low speed driving situations the vehicle may be operated by only using the electric propulsion system and when more power is needed the internal combustion engine supplies additional power to the driveline, for example when driving at higher speeds. Also hybrid electric vehicles have batteries or battery units that store energy, where the batteries are used for providing electrical power for propelling and accelerating the vehicle and for systems used in the vehicle. A plug-in hybrid electric vehicle uses a system with re-chargeable batteries that can be restored into a full charge condition through a connection to an external electric power supply.

When re-charging batteries in electric vehicles or hybrid electric vehicles an on-board charging system is generally used. The onboard charger often uses a rectifier circuit to transform alternating current (AC) from the external electric power supply, such as an electrical grid, to direct current (DC) suitable for re-charging the batteries. The on-board charger may be connected to the electrical grid via a charging cable having a charging plug that is designed to match a corresponding charging socket arranged in the vehicle.

One common problem with this type of battery re-charging is that cost and thermal issues limit how much power the rectifier can handle. It is therefore sometimes better to use an external charging station that delivers direct current (DC) to the vehicle's batteries for a much faster re-charging, instead of using the onboard charging system. Dedicated external charging stations for fast vehicle battery re-charging operations can be built in permanent locations and provided with high-current connections to the electrical grid. Also these fast charging stations use charging cables for connecting the charging station to the vehicles. The charging cables have a direct current charging plug that is designed to match a corresponding direct current charging socket arranged in the vehicle.

There are on the market today different direct current charging systems that are used for efficient and fast charging of batteries in electric and hybrid electric vehicles. Examples of such charging systems used today are CHAdeMO (Charge de Move), CCS (Combined Charging System) and Tesla Superchargers, where each system has its own unique type of charging plug and socket configuration, giving each system its own type of charging interface.

This setup with different direct current charging systems adds complexity to the construction of the battery units of electric vehicles and hybrid electric vehicles if more than one system for direct current re-charging should be possible to use in the vehicle, since the vehicle has to be equipped with more than one type of charging interface connected to the battery unit. The battery unit then has to be equipped with more than one set of components for the different charging interfaces, such as separate contactors and control units for each type of charging system to avoid that more than one direct current charging system is connected to the vehicle, and to avoid that a voltage is present on the non-used connectors when charging. If for example a vehicle is designed for re-charging with all three direct current charging systems mentioned above, the vehicle must be equipped with one CHAdeMO connecting unit, one CCS connecting unit and one Tesla Supercharger connecting unit, where each unit needs its separate components in the battery unit.

There are many disadvantages with such a battery unit construction, e.g. since there are space and weight limitations when constructing the vehicle. The size of the battery units should be as small as possible and the need for extra components in the battery units adds unwanted volume and weight. Another possibility would be to use separate charging adapters for use with different type of chargers, but then you may need to carry a number of different adapters on board the vehicle.

There is thus a need for an improved construction where different charging systems can be used in a vehicle, without increasing volume, weight, and complexity to the battery units with many different components.

SUMMARY

An object of the present disclosure is to provide a vehicle charging interface unit, a system for charging a vehicle and a vehicle, where the previously mentioned problems are avoided.

This object is at least partly achieved by the features of the independent claims. The dependent claims contain further developments of the vehicle charging interface unit, system for charging a vehicle and vehicle.

The disclosure concerns a vehicle charging interface unit for connecting a battery unit of a vehicle to a charging cable, and also a system for charging a vehicle comprising a charging interface unit, a battery unit, a charging cable and a connection device. The charging interface unit comprises a connection device that is establishing electric connection between the charging interface unit and the battery unit, and two or more connectors for connecting the charging cable to the charging interface unit. The charging interface unit further comprises a mechanical blocking device, configured to allowing access to only one of the two or more connectors at the same time. Advantages with these features are that through the design of the charging interface unit, different charging systems can be used in the vehicle, without increasing volume, weight, and complexity to the battery unit. The size of the battery unit can be made smaller, since extra components in the battery unit adding unwanted volume and weight can be avoided. The mechanical blocking device secures that only one charging cable can be connected to the vehicle at the same time when re-charging the batteries. The mechanical blocking device further prevents access to the connectors by e.g. fingers and also ingress of solid foreign objects to the connectors. Consistent with embodiments described herein, the mechanical blocking device is preferably provided with a level of intrusion protection corresponding to an International Electrotechnical Commission (IEC) standard 60529 (relating to degrees of protection provided by an enclosure; commonly referred to as an International Protection code or "IP Code") rating of IP 2x, where x is an integer value, and more preferably with an IP Code of IP 22 or higher, which indicates protection against insertion of fingers and damage from dripping water.

According to an aspect of the disclosure, each individual connector has a unique configuration being different from the configuration of the one or more other connectors. In this way, the vehicle batteries can be re-charged with different external direct current charging system, where the configuration of the connectors may vary between different systems.

According to another aspect of the disclosure, a first connector is of a CHAdeMO configuration, a second connector is of a CCS configuration and a third connector is of a Tesla Supercharger configuration. An advantage with these features is that the batteries in the vehicle can be re-charged with some of the most common charging systems on the market today.

According to a further aspect of the disclosure, the mechanical blocking device is constituted by a two or more doors slidably arranged in the charging interface unit, where the doors are configured to allowing access to only one of the two or more connectors. Advantages with these features are that the mechanical blocking device of the charging interface unit can be made in a simple and cost efficient way, allowing access to only one connector.

According to another aspect of the disclosure, the mechanical blocking device is constituted by a roll front door arranged in the charging interface unit, where the roll front door has an opening configured to allowing access to only one of the two or more connectors. An advantage with these features is that the mechanical blocking device of the charging interface unit can be made in a simple alternative way, allowing access to only one connector.

According to another aspect of the disclosure, the mechanical blocking device is constituted by an endless-belt type door arranged in the charging interface unit, where door has an opening configured to allowing access to only one of the two or more connectors. An advantage with these features is that the mechanical blocking device of the charging interface unit can be made in a simple alternative way, allowing access to only one connector.

The disclosure further concerns a vehicle comprising a charging interface unit.

BRIEF DESCRIPTION OF DRAWINGS

The disclosure will be described in greater detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
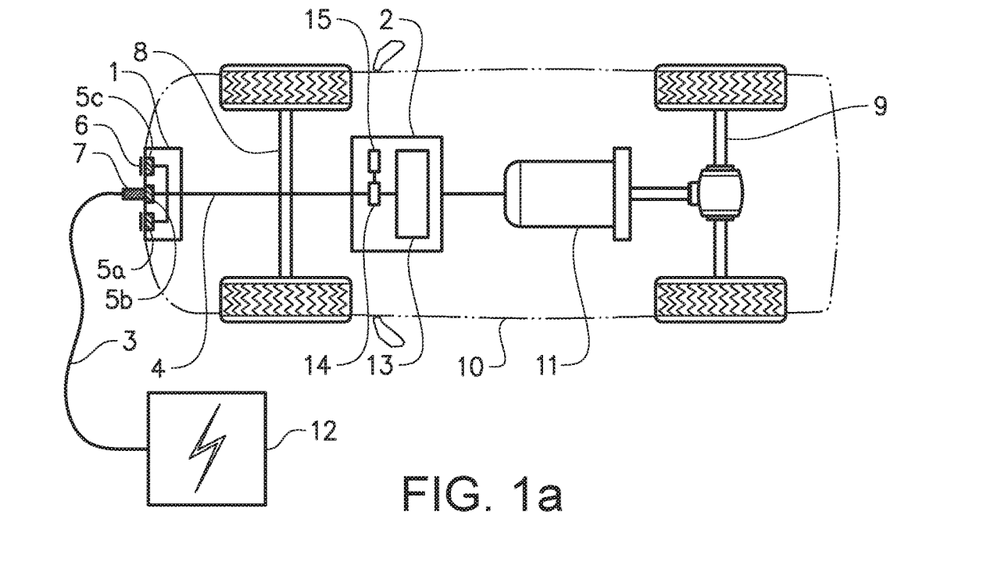
FIGS. 1a-b show schematically, a system for charging a vehicle and a vehicle charging interface unit according to the disclosure.

FIG. 1a schematically shows a system for charging a vehicle 10, such as an electric or a hybrid electric vehicle, where a vehicle charging interface unit 1 is connecting a battery unit 2 of the vehicle to a charging cable 3. The vehicle has a front axle 8 and a rear axle 9 and the vehicle is operated by means of an electric machine 11. According to the embodiment shown in FIG. 1a, the electric machine 11 is configured to drive the rear axle 9. However, the invention is not limited to this design only but can be applied to other types of configurations, wherein e.g. the electric machine 11 can be arranged to instead drive the front axle 8 or to drive both the front axle 8 and the rear axle 9. Further, one or more electric machines 11 can be arranged to drive one or more individual wheels of the vehicle. In a hybrid electric vehicle, the electric machine 11 can be combined with an internal combustion engine to operate the vehicle with either electric drive or with the combustion engine, or a combination of both.

The system is designed for fast charging of the vehicle with direct current (DC) and there are different direct current charging systems that are used for efficient and fast charging of batteries in electric and hybrid electric vehicles. Examples of such charging systems used today are CHAdeMO (Charge de Move), CCS (Combined Charging System) and Tesla Superchargers, where each system has its own unique type of charging plug and socket configuration, giving each system its own type of charging interface. Other types of direct current charging systems may also be used.

The vehicle charging interface unit 1 comprises a connection device 4 establishing electric connection between the charging interface unit 1 and the battery unit 2. The charging interface unit 1 is equipped with two or more connectors 5 for connecting the charging cable 3 to the charging interface unit 1. In the embodiment shown in FIGS. 1a and 1b, the charging interface unit has three connectors 5a, 5b, 5c. The first connector 5a is of the CHAdeMO type having a socket with a specific CHAdeMO configuration. The second connector 5b is of the CCS type having a socket with a specific CCS configuration and the third connector 5c is of the Tesla Supercharger type with a specific Tesla Supercharger configuration. This means that the charging interface unit is designed with three different connectors 5a, 5b, 5c, where each individual connector 5a, 5b, 5c has a unique configuration different from the configuration of the two other connectors. Charging cables 3 with charging plugs 7 having configurations corresponding to the different connectors 5a, 5b, 5c may be connected to the charging interface unit 1, so that e.g. a CCS charging plug is connected to the corresponding second connector 5b with CCS configuration.

The disclosure is not limited to the specific use of three connectors 5. The charging interface unit 1 may be designed with two or more connectors, whatever is desired from a re-charging standpoint. One option would be to design the charging interface unit 1 with a suitable number of connectors 5 for a specific market. The charging systems may vary from market to market and the construction allows the charging interface unit 1 to be exchanged to suit a specific market or specific markets where the vehicle is operated.

The charging interface unit 1 may be arranged at a suitable location within the vehicle so that the user of the vehicle easily could access the connectors 5 when re-charging the battery. As an example, the charging interface unit 1 may be located in the front end of the vehicle, as shown in FIG. 1a. However other locations are possible depending on the design of the vehicle. The charging interface unit 1 may instead be located at the rear end of the vehicle or along the sides of the vehicle, whatever is most suitable from a vehicle construction and accessibility standpoint. The charging interface unit may also be covered by a hinged door or similar construction so that the charging interface unit is not visible when not re-charging the vehicle. The charging unit is preferably located close to the battery in order to minimize losses in the battery cables.

This configuration with three different connectors 5a, 5b, 5c is giving the user of the vehicle the possibility to re-charge the vehicle with three different fast charging direct current systems. Thus, the batteries can be re-charged at three different external fast charging station types, instead of only one that often is the case when the vehicle is provided with only one type of charging connector. In FIG. 1a, an external charging station 12 delivers direct current (DC) to the vehicle's batteries in the battery unit 2 via the charging cable 3 and the charging interface unit 1 for fast battery re-charging. Dedicated external charging stations for fast battery re-charging operations may be located in different locations and provided with high-current connections to the electrical grid.

Figure 1B:
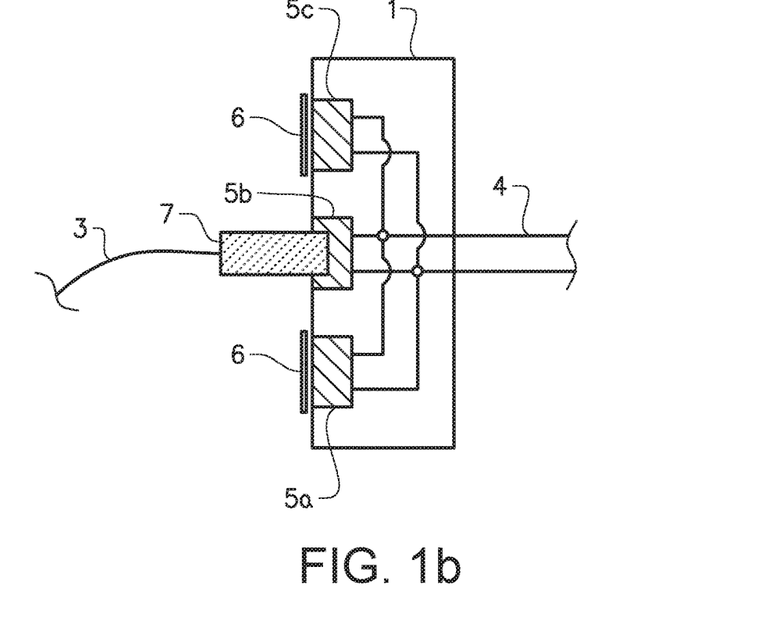

As further can be seen in FIGS. 1a and 1b, the first connector 5a, the second connector 5b and the third connector 5c of the vehicle charging interface unit 1 are all connected in parallel and further connected to the connection device 4, which is establishing electric connection between the charging interface unit 1 and the battery unit 2. The connection device 4 may be made of two high-current power distribution cables that are connecting the connectors 5a, 5b, 5c to the battery unit 2 for efficient distribution of charging power to the vehicle.

The technology involved in electric vehicles and hybrid electric vehicles is closely related to the development of chargeable batteries. Today, lithium-ion batteries are considered as a suitable battery technology for electric vehicles and hybrid electric vehicles, where range, power, and recharging time are critical factors. Other battery types may also be used. The battery unit 2 is supplying electric energy to the electric machine 11, meaning that the battery unit 2 consequently is a traction battery for the electric machine 11. The battery unit 2 comprises a plurality of battery cells 13 (not shown in detail in FIG. 1a), and according to known technology, the battery cells are connected in series in order to provide an output DC voltage with a desired voltage level suitable for driving the electric machine 11. The battery cells 13 may be of lithium-ion type, but other types of battery cells may also be used. The battery unit 2 and the electric machine 11 may be connected to each other via a power control unit that is regulating the power output from the electric machine 11. The battery cells 13 can be re-charged via the fast charging direct current systems described above and the external charging station 12, schematically shown in FIG. 1a, delivers charging power to the vehicle. The vehicle is connected to the external charging unit 12 with the charging cable 3 when there is a need to re-charge the battery cells 13.

The battery unit further comprises a contactor 14 that can connect the charging current to the battery when charging or can disconnect the charging current when e.g. an error occurs or when the battery is fully charged. The contactor 14 is controlled by a control unit 15. The control unit 15 secures that charging current is transferred to the battery cells 13 when the vehicle is connected to the external charging unit 12.

This setup with different direct current charging connectors 5a, 5b, 5c connected in parallel and arranged in a charging interface unit 1 makes the construction of the battery unit 2 of the vehicle less complex, since fewer components can be used in the design of the battery unit 2. More than one system for direct current re-charging is thus possible to use in the vehicle, since the vehicle is equipped with more than one type of charging interface connected to the battery unit 2. The battery unit 2 may with this design be equipped with only one set of components for the different charging interfaces, since the connectors 5a, 5b, 5c are connected in parallel in the charging interface unit 1. Separate contactors for each type of charging system are not needed in the battery unit 2.

There are also space and weight limitations when constructing vehicles. The size of the battery units should be as small as possible and the need for extra components in the battery units adds unwanted volume and weight. The design of the battery unit 2 as described above allows a compact and lightweight construction.

To avoid that more than one direct current charging system is connected to the vehicle at the same time, the charging interface unit 1 further comprises a mechanical blocking device 6, configured to allowing access to only one of the connectors 5a, 5b, 5c. Since the three connectors 5a, 5b, 5c are connected in parallel, the user of the vehicle should only have the possibility to connect one charging cable 3 to the vehicle at the same time for a safe operation of the re-charging process. Through the mechanical blocking device 6, the user of the vehicle is prevented from connecting the vehicle to more than one charging system at the same time. Further, through the mechanical blocking device 6, the user cannot come into contact with the other connectors, which are connected in parallel and thus will carry the same charging voltage. The mechanical blocking device will thus prevent access to the connectors by e.g. fingers and will also prevent ingress of solid foreign objects to the connectors. Mechanical blocking device 6 is preferably provided with an intrusion protection corresponding to an IP Code of IP 2x and more preferably with an IP Code of IP 22 or higher.

In FIGS. 2a-e, a first embodiment of the mechanical blocking device 6 is shown, where the charging interface unit 1 comprises a frame structure 16, in which the three connectors 5a, 5b, 5c are located. The frame structure 16 has a rear wall 17, two side walls 18 and a front structure 19. Three doors 20a, 20b, 20c are slidably integrated in the front structure 19 and the doors 20a, 20b, 20c with their specific individual configurations constitute the mechanical blocking device 6, as will be further described below. The frame structure 16 may be made of a suitable material, such as for example plastic materials, composite materials, metals or a combination of different materials.

Figure 2A:
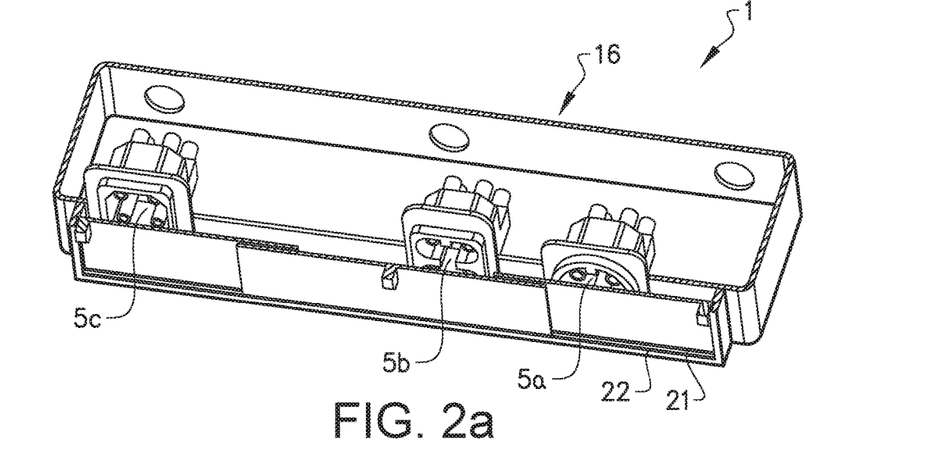
FIGS. 2a-e show schematically in perspective views, a vehicle charging interface unit according to an embodiment of the disclosure.
Figure 2B:
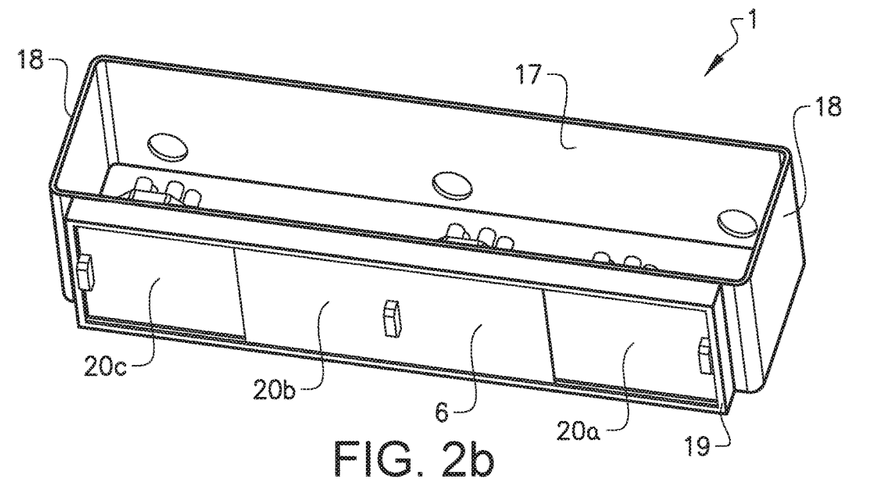

The doors 20a, 20b, 20c are configured within the front structure 19 so that only one of the connectors 5a, 5b, 5c can be accessed, in order to avoid that more than one direct current charging system is connected to the vehicle at the same time. As shown in FIG. 1a, the first connector 5a is located on the right hand side within the frame structure 16, the third connector 5c on the left hand side, and the second connector 5b is located between the first connector 5a and the third connector 5c. In FIG. 2b, the charging interface unit 1 is in its closed state, where a first door 20a is blocking the first connector 5a, a second door 20b is blocking the second connector 5b and a third door 20c is blocking the third connector 5c. In this closed state, the connectors 5a, 5b, 5c cannot be accessed.

The front structure 19 may in a known way be provided with a set of inner grooves 21 and a set of outer grooves 22 arranged in the respective lower and upper parts to which the doors 20a, 20b 20c are slidably arranged, so that the doors 20a, 20b, 20c may be opened through a sliding action giving access to the respective connectors 5a, 5b, 5c. The first door 20a and the third door 20c are both slidably arranged in the respective set of inner grooves 21 of the lower and upper parts of the front structure 19 and the second door 20b is slidably arranged in the respective set of outer grooves 22 of the lower and upper parts of the front structure 19. The doors 20a, 20b, 20c may be provided with knobs or small handles for an easy sliding action. There are three different open states for the charging interface unit 1 as further shown in FIGS. 2c-e, each open state giving access to the respective connectors 5a, 5b, 5c.

Figure 2C:
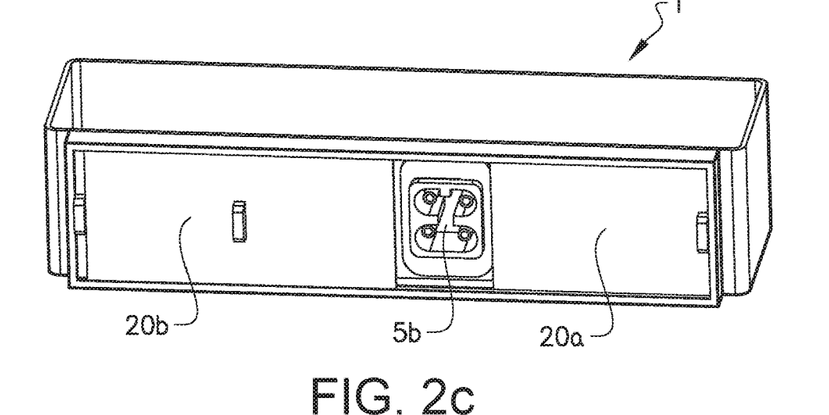

In FIG. 2c, the second door 20b is slid to the left in the outer grooves 22 of the front structure 19 giving access to the second connector 5b. Through the arrangement of the second connector 5b in the frame structure 16, the second connector 5b is easily accessible when the second door 20b is in the leftmost position. The charging cable 3 with the charging plug 7 having corresponding configuration can now be connected to the second connector 5b. When the charging plug 7 is connected to the second connector 5b, the charging plug 7 is preventing the sliding movements of the first door, 20a, the second door 20b and the third door 20c, so that the first connector 5a and the third connector 5c cannot be accessed as long as the charging plug 7 is connected to the second connector 5b. The first connector 5a is blocked by the first door 20a and the third connector 5c is blocked by both the second door 20b and the third door 20c. Once the vehicle has been re-charged, the charging plug 7 is disconnected from the second connector 5b and the second door 20b can be slid into the closed state, as shown in FIG. 2b.

Figure 2D:
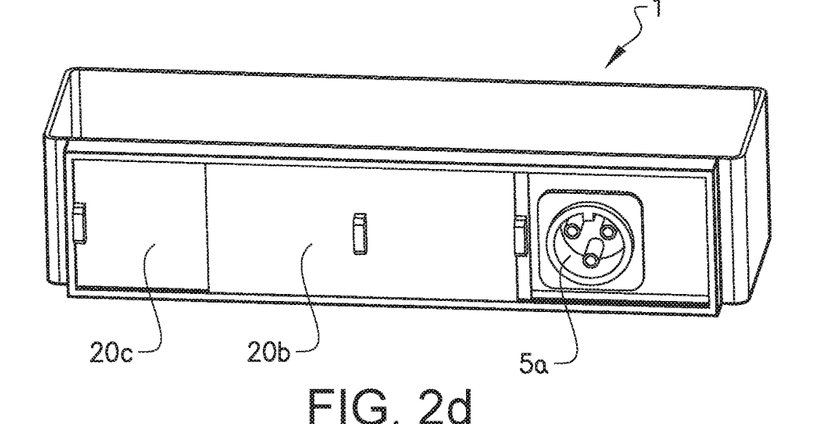

In FIG. 2d, the first door 20a is slid to the left in the inner grooves 21 of the front structure 19 giving access to the first connector 5a. Through the arrangement of the first connector 5a in the frame structure 16, the first connector 5a is easily accessible when the first door 20a is slid to the left into a position giving full access to the first connector 5a. The charging cable 3 with the charging plug 7 having corresponding configuration can now be connected to the first connector 5a. When the charging plug 7 is connected to the first connector 5a, the charging plug 7 is preventing a sliding action to the right of the first door 20a and the second door 20b. Since the first door 20a and the third door 20c are both arranged in the same inner grooves 21, the first door 20a is blocking a sliding action to the right of the third door 20c. The second door 20b may possibly be slid in the left direction but the first door 20a is now blocking the second connector 20b. In this way the second connector 20b and the third connector 20c cannot be accessed as long as the charging plug 7 is connected to the first connector 5a. The second connector 5b is blocked by the first door 20a and the third connector 5c is blocked by the third door 20c. Once the vehicle has been re-charged, the charging plug 7 is disconnected from the first connector 5a and the first door 20a can be slid into the closed state, as shown in FIG. 2b.

Figure 2E:
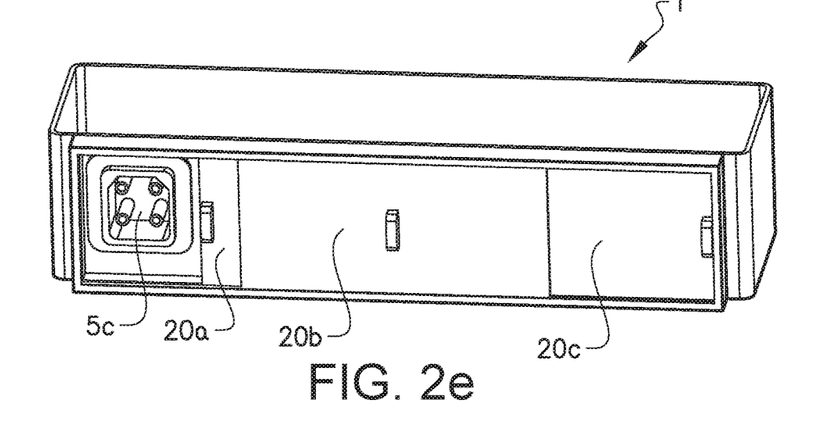

In FIG. 2e, the third door 20c is slid to the right in the inner grooves 21 of the front structure 19 giving access to the third connector 5c. Through the arrangement of the third connector 5c in the frame structure 16, the third connector 5c is easily accessible when the third door 20c is slid to the right into a position giving full access to the third connector 5c. The charging cable 3 with the charging plug 7 having corresponding configuration can now be connected to the third connector 5c. When the charging plug 7 is connected to the third connector 5c, the charging plug 7 is preventing a sliding action to the left of the third door 20a and the second door 20b. Since the first door 20a and the third door 20c are both arranged in the same inner grooves 21, the third door 20c is blocking a sliding action to the left of the first door 20a. The second door 20b may possibly be slid in the right direction but the third door 20c is now blocking the second connector 20b. Also, as seen in FIGS. 2a and 2c, the second connector 5b is not positioned in the centre of the frame structure but is positioned more to the right within the frame structure 16 so that when the second door 20b is slid to the right the second connector will still be blocked by the second door 20b. In this way the second connector 20b and the first connector 20a cannot be accessed as long as the charging plug 7 is connected to the third connector 5c. The first connector 5a is blocked by the first door 20a. Once the vehicle has been re-charged, the charging plug 7 is disconnected from the third connector 5c and the third door 20c can be slid into the closed state, as shown in FIG. 2b.

The charging interface unit 1 may in the same way as described above instead be arranged with two, four or more than four doors. If for example two connectors are used, instead two doors will be arranged in the front structure 19. There are many ways to configure different numbers of connectors and doors in the front structure 19, and the number of grooves in the respective lower and upper part of the front structure may be varied.

Further, the charging interface unit 1 may be constructed with a housing structure instead of a frame structure. Such a housing structure may comprise a rear wall, side walls, an upper wall, a lower wall and a front structure. The front structure may in the same way as described above be arranged with one or more grooves for two or more doors.

Figure 3A:
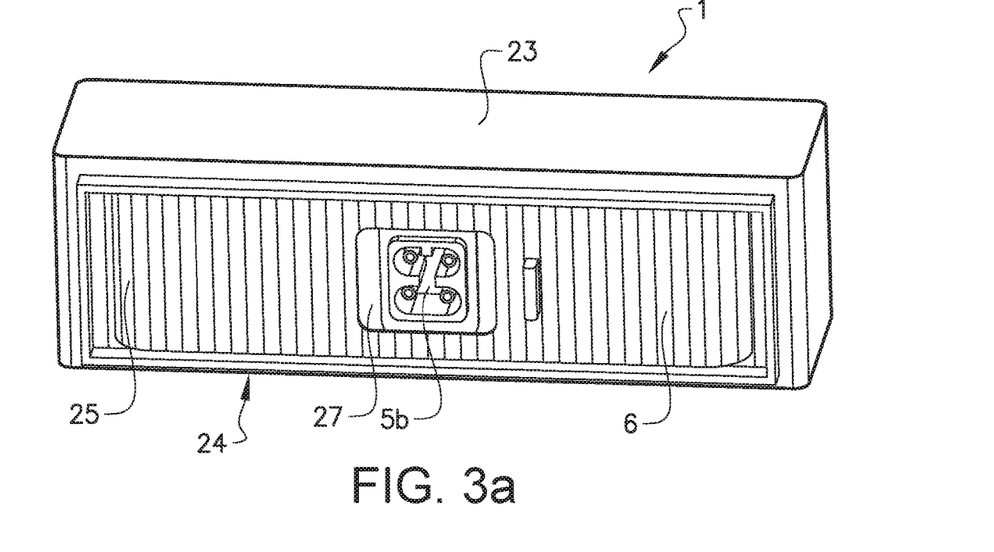
FIGS. 3a-b show schematically in a perspective view, a vehicle charging interface unit according to another embodiment of the disclosure.
Figure 3B:
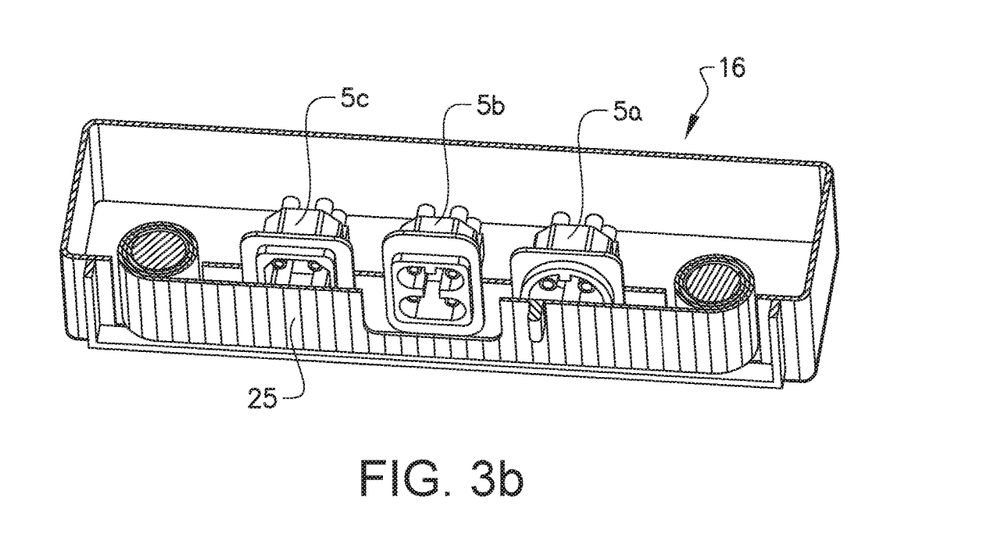

In FIGS. 3a and 3b, a second embodiment of the mechanical blocking device 6 is shown, where the charging interface unit 1 comprises a frame structure 16, in which the three connectors 5a, 5b, 5c are located. The frame structure 16 has an upper wall 23 and a lower wall 24. Further, the frame structure may comprise side walls and a rear wall if desired. A well-known type of roll front door 25 constitutes the mechanical blocking device 6. The roll front door 25 may e.g. be arranged in a cut-out provided in the upper side of the lower wall 24 and in a corresponding cut-out provided in the lower side of the upper wall 23 or in grooves provided in the upper side of the lower wall 24 and in the lower side of the upper wall 23. The roll front door 25 is provided with a single opening 27, which opening 27 is giving access to one of the connectors 5a, 5b, 5b, while preventing access to the other two connectors 5a, 5b, 5c. The roll front door 25 is slidably arranged in the frame structure 16 so that the roll front door 25 can provide access to the desired connector 5a, 5b, 5c, simply by sliding the roll front door to the desired position. The roll front door 25 may be manufactured from a flexible material that is allowing the roll front door 25 to easily be slidably arranged in the frame structure 16. As an alternative, the roll front door 25 may be constructed from a number of pieces of non-flexible material with flexible hinges between the pieces of non-flexible material. The roll front door 25 may be made of a suitable material, such as for example plastic materials, composite materials, metals or a combination of different materials. By sliding the roll front door 25 into the desired position the user of the vehicle may choose the right connector type for re-charging the vehicle. The charging interface unit 1 may also be arranged with two, four or more than four connectors.

Figure 4A:
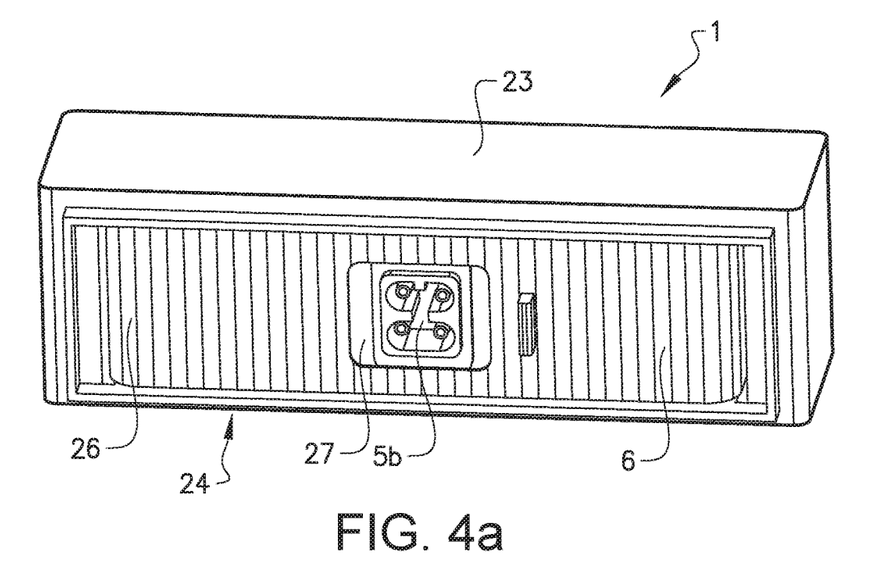
FIGS. 4a-b show schematically in a perspective view, a vehicle charging interface unit according to another embodiment of the disclosure.
Figure 4B:
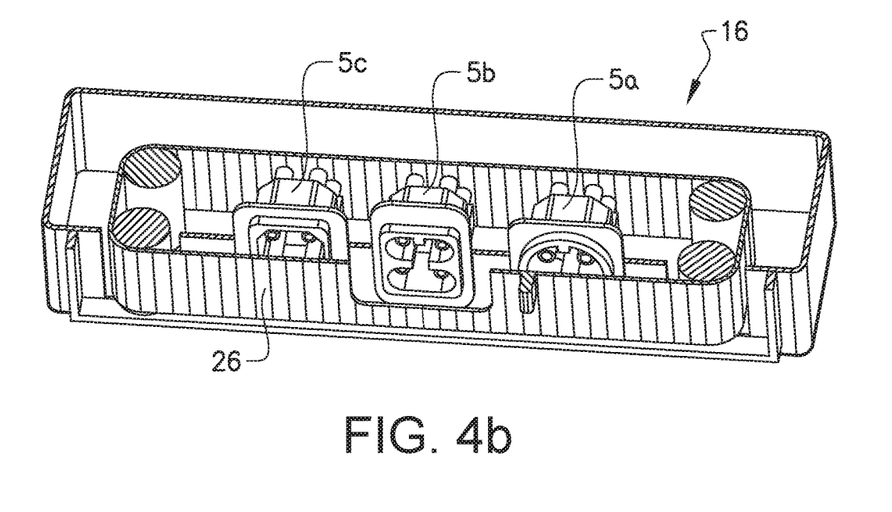

As an alternative to the roll front door design, shown in FIGS. 4a and 4b, a flexible sliding door 26 of the endless-belt type may constitute the mechanical blocking device 6. The sliding door 26 may be arranged in a continuous groove in the upper side of the lower wall 24 along the outer periphery and in a continuous groove in the lower side of the upper wall 23 along the outer periphery. The flexible sliding door 26 may also be arranged around rotatable rollers which allow the opening 27 to easily be positioned in the desired position. In the same way as described above, the door 26 is provided with a single opening 27 for easy access to the respective connectors 5a, 5b, 5c. By sliding the door 26 into the desired position, the user of the vehicle may choose the right connector type for re-charging the vehicle. The charging interface unit 1 may also be arranged with two, four or more than four connectors.

The mechanical blocking device may not necessarily be of the door type as described in the embodiments above. Other suitable constructions are also possible within the scope of the disclosure.

As an example, a mechanical construction with blocking spring actuated covers is also possible as mechanical blocking device. One cover may be arranged at each connector, which cover is allowing or preventing access to the connector. If no charging plug is connected to the charging interface unit it is possible to connect a charging cable to any of the connectors. The covers may for example be constructed so that they through spring action are pushed over the empty connectors when a charging plug is connected to one connector. When a charging plug is connected to one of the connectors, a lever mechanism or the like of that connector will through spring action actuate a cover locking mechanism of the other covers arranged at the other connectors. In this way it is not possible to connect another charging plug to the charging interface unit as long as the charging plug is connected, since the covers will prevent access to the connectors. The other covers are thus prevented from being opened as long as the charging plug is connected to the charging interface unit. The covers may be arranged over each charging socket of the connectors or next to the charging socket so that the charging plug is activating the cover locking mechanism.

Another example of a mechanical blocking device could for example be to let the non-used connectors tilt away from the insertion position of the charging plug so that they cannot be reached.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A vehicle charging interface unit for connecting a battery unit of a vehicle to a charging cable, the charging interface unit comprising a connection device establishing electric connection between the charging interface unit and the battery unit and at least first, second, and third connectors for connecting the charging cable to the charging interface unit,
    wherein the charging interface unit further comprises a mechanical blocking device, configured for allowing access to only one of the first, second and third connectors at the same time,
    wherein the mechanical blocking device comprises three or more doors slidably arranged in the charging interface unit between three distinct configuration states, the configuration states comprising:
        a first configuration state that provides access to the first connector and blocks access to the second and third connectors;
        a second configuration state that provides access to the second connector and blocks access to the first and third connectors; and
        a third configuration state that provides access to the third connector and blocks access to the first and second connectors.

2. The vehicle charging interface unit of claim 1, wherein each individual connector has a unique configuration being different from the configuration of the one or more other connectors.

3. The vehicle charging interface unit of claim 2, wherein the first connector is of a Charge de Move (CHAdeMO) configuration, the second connector is of a Combined Charging System (CCS) configuration, and the third connector is of a Tesla™ Supercharger configuration.

4. The vehicle charging interface unit of claim 1, wherein the mechanical blocking device is provided with an IP Code of IP 2x, where x is an integer value.

5. The vehicle charging interface unit of claim 4, wherein the mechanical blocking device is provided with an IP Code of IP 22.

6. A vehicle comprising a charging interface unit according to claim 1.

7. A vehicle charging interface unit for connecting a battery unit of a vehicle to a charging cable, the charging interface unit comprising a connection device establishing electric connection between the charging interface unit and the battery unit and two or more connectors for connecting the charging cable to the charging interface unit,
    wherein the charging interface unit further comprises a mechanical blocking device, configured for allowing access to only one of the two or more connectors at the same time, wherein the mechanical blocking device is constituted by a slidable component arranged in the charging interface unit where the slidable component is at least partially formed of a flexible material and includes an opening therein configured to provide access to only one of the two or more connectors at a time when the slidable component is slidingly moved relative to the two or more connectors.

8. The vehicle charging interface unit of claim 7,
wherein the charging interface unit comprises first and second rotatable spools provided on either side of the two or more connectors, and
wherein the slidable component comprises a roll front door having a first end coupled to the first rotatable spool and a second end coupled to the second rotatable spool.

9. The vehicle charging interface unit of claim 7,
wherein the charging interface unit comprises a first pair of rotatable rollers and a second pair of rotatable rollers provided on either side of the two or more connectors, and
wherein the slidable component comprises an endless-belt type flexible door arranged around the first and second airs of rotatable rollers.

10. A system for charging a vehicle comprising:
a charging interface unit;
a battery unit;
a charging cable; and
a connection device,
wherein the charging interface unit connects the battery unit of the vehicle to the charging cable,
wherein the charging interface unit comprises the connection device for establishing an electric connection between the charging interface unit and the battery unit and three or more connectors for connecting the charging cable to the charging interface unit,
wherein the charging interface unit further comprises a mechanical blocking device, configured for alternatingly allowing unique access to each of the three or more connectors while preventing access to the others of the three or more connectors.

11. The system for charging a vehicle according to claim 10, wherein each individual connector has a unique configuration being different from the configuration of the one or more other connectors.

12. The system for charging a vehicle according to claim 11, wherein a first connector is of a Charge de Move (CHAdeMO) configuration, a second connector is of a Combined Charging System (CCS) configuration, and a third connector is of a Tesla™ Supercharger configuration.

13. The system for charging a vehicle according to claim 10, wherein the mechanical blocking device comprises the or more doors slidably arranged in the charging interface unit, where the doors are configured for allowing access to only one of the two or more connectors, wherein the three or more doors are slidable between three distinct configuration states, the configuration states comprising:
a first configuration state that provides access to a first connector and blocks access to the second and third connectors;
a second configuration state that provides access to a second connector and blocks access to the first and third connectors; and
a third configuration state that provides access to a third connector and blocks access to the first and second connectors.

14. The system for charging a vehicle according to claim 10,
wherein the charging interface unit comprises first and second rotatable spools provided on either side of the two or more connectors, and
wherein the mechanical blocking device comprises a roll front door having a first end coupled to the first rotatable spool and a second end coupled to the second rotatable spool, where the roll front door has an opening configured for allowing access to only one of the three or more connectors.

15. The system for charging a vehicle according to claim 10,
wherein the charging interface unit comprises a first pair of rotatable rollers and a second pair of rotatable rollers provided on either side of the two or more connectors, and
wherein the mechanical blocking device comprises an endless-belt type flexible door arranged around the first and second pairs of rotatable rollers, where the door includes an opening configured for allowing access to only one of the three or more connectors.

* * * * *